(12) United States Patent
De Picciotto

(10) Patent No.: US 9,086,284 B2
(45) Date of Patent: Jul. 21, 2015

(54) METHOD FOR AUTOMATICALLY MANAGING A PITCH RATE GYROSCOPE MOUNTED ON A FLYING DEVICE

(75) Inventor: François De Picciotto, Paris (FR)

(73) Assignee: MBDA France, Paris (FR)

( * ) Notice: Subject to any disclaimer, the term of this patent is extended or adjusted under 35 U.S.C. 154(b) by 0 days.

(21) Appl. No.: 14/115,999

(22) PCT Filed: May 9, 2012

(86) PCT No.: PCT/FR2012/000183
§ 371 (c)(1),
(2), (4) Date: Jan. 31, 2014

(87) PCT Pub. No.: WO2012/156594
PCT Pub. Date: Nov. 22, 2012

(65) Prior Publication Data
US 2014/0158813 A1   Jun. 12, 2014

(30) Foreign Application Priority Data
May 13, 2011   (FR) ...................... 11 01455

(51) Int. Cl.
| | | |
|---|---|---|
| *F41G 7/36* | (2006.01) | |
| *G01C 21/16* | (2006.01) | |
| *F42B 15/01* | (2006.01) | |
| *F42B 10/02* | (2006.01) | |
| *G01C 25/00* | (2006.01) | |
| *F41G 7/00* | (2006.01) | |
| *G01C 21/00* | (2006.01) | |

(52) U.S. Cl.
CPC ............... *G01C 21/16* (2013.01); *F42B 10/02* (2013.01); *F42B 15/01* (2013.01); *G01C 25/00* (2013.01)

(58) Field of Classification Search
CPC ........ G01C 21/10; G01C 21/12; G01C 21/16; G01C 21/165; G01C 21/18; G01C 25/00; G01C 25/005; F42B 10/02; F42B 15/01
USPC ........... 701/400, 408, 500, 505–512; 244/3.1, 244/3.15, 3.2; 372/92, 93, 94
See application file for complete search history.

(56) References Cited

U.S. PATENT DOCUMENTS

| | | | | |
|---|---|---|---|---|
| 3,925,642 | A | * 12/1975 | Roantree et al. | 701/505 |
| 3,925,643 | A | * 12/1975 | Roantree et al. | 701/509 |
| 4,017,187 | A | 4/1977 | Schwartz | |
| 4,343,035 | A | * 8/1982 | Tanner | 701/500 |
| 4,786,908 | A | 11/1988 | Runnalls | 701/408 |
| 5,194,872 | A | * 3/1993 | Musoff et al. | 701/505 |
| 5,442,442 | A | * 8/1995 | Kanegsberg et al. | 372/94 |
| 5,699,256 | A | * 12/1997 | Shibuya et al. | 701/509 |
| 5,941,935 | A | * 8/1999 | Fernandez | 701/507 |
| 6,032,099 | A | * 2/2000 | Fernandez | 701/508 |
| 6,711,517 | B2 | 3/2004 | Brunstein | |
| 8,519,313 | B2 * | 8/2013 | Geswender et al. | 244/3.2 |

FOREIGN PATENT DOCUMENTS

EP   0392104   10/1990

* cited by examiner

*Primary Examiner* — Bernarr Gregory
(74) *Attorney, Agent, or Firm* — Duane Morris LLP; J. Rodman Steele, Jr.; Gregory M. Lefkowitz

(57) ABSTRACT

The invention relates to a flying device (1), in particular an air missile, which is of the inertial navigation type, which is rotatable and includes a pitch rate gyroscope (2), wherein said device also comprises automatic control means (8) for rotating same about the longitudinal axis (3) thereof, regularly alternating the direction of rotation, so as to cancel the effect of the scale factor of the pitch rate gyroscope (2), in addition to correcting ordinary drifts.

6 Claims, 1 Drawing Sheet

Legend for Fig. 1
2- Pitch rate gyro
5- Control means
6- Control system
8- Automatic control means Legend for Fig. 1
2- Pitch rate gyro
5- Control means
6- Control system
8- Automatic control means

METHOD FOR AUTOMATICALLY MANAGING A PITCH RATE GYROSCOPE MOUNTED ON A FLYING DEVICE

CROSS-REFERENCE TO RELATED APPLICATIONS

This application is a §371 national stage entry of International Application No. PCT/FR2012/00183, filed May 9, 2012, which claims priority to French Patent Application No. 1101455, filed May 13, 2011, the entire contents of which are incorporated herein by reference.

The present invention relates to a method for automatically managing a pitch rate gyro mounted on a flying craft with inertial navigation that is capable of rotating, as well as to a flying craft, in particular an airborne missile, which is equipped with such a pitch rate gyro.

It is known that the drift of inertial navigation limits the range of a missile. Furthermore, when the missile is a low-cost missile (for example, an air-to-ground missile), the general aim is to reduce this drift without using an additional sensor (other than the inertial unit already present on the missile) so to avoid an increase in cost.

A known method for overcoming this problem consists in causing the missile to auto-rotate (always in the same direction) about its longitudinal axis. This rotation on average cancels the majority of drifts.

However, this conventional method is not entirely satisfactory as it does not allow the correction of scale factor faults in the pitch rate gyro. For this reason the pitch rate gyro generally has to be replaced with a gyroscope, which involves numerous additional constraints:

additional cost (development, integration, etc.);
if the inertial unit is based on current "vibrating" technology (for example, of the MEMS type), the gyroscope can only operate at high rotational speeds (greater than 1,000°/s), and retains a drift of the order of 1°/s, which negates any advantage in this solution (drift greater than the normal gyrometric bias of a low-cost MEMS unit); and
if the inertial unit is based on older technology (of the spinning wheel gyro type), then there do not appear to be any rotational speed constraints, but this technology is becoming obsolete.

The object of the present invention is to overcome these disadvantages. The present invention relates to a method for automatically managing a pitch rate gyro mounted on a flying craft with inertial navigation, in particular an airborne missile, which is capable of rotating, said managing method making it possible to avoid the need to replace the pitch rate gyro with a gyroscope, and thus to reduce the cost, for comparable navigation performance.

To this end, according to the invention, said method is noteworthy in that, when using the pitch rate gyro, said flying craft is automatically controlled so that it can be rotated about its longitudinal axis by regularly alternating the direction of rotation (every n rotations, with n being an integer greater than or equal to 1), so as to automatically cancel the scale factor effect of the pitch rate gyro, as well as to correct the common drifts, which are corrected by rotating the flying craft.

Thus, by controlling the flying craft in a way that is designed for it to experience a regularly alternating rotation, the scale factor effect of the pitch rate gyro mounted on said flying craft, in addition to other common drifts, is naturally cancelled, as described hereafter. With regard to these other drifts, they are cancelled by the present invention in the same way as for the conventional aforementioned method of auto-rotating in one direction.

The requirement for a gyroscope is thus significantly reduced (disappearance of the drift due to the scale factor of the pitch rate gyro), and the present invention allows a gyro to be retained for various applications. The present invention thus allows the cost to be reduced for navigation performance comparable to that which involves the use of a gyroscope.

The invention can be applied to any type of missile with inertial navigation, the roll of which is possible without any other constraint (range, operating concept, etc.).

Preferably, the direction of rotation is alternated after each rotation of the flying craft (n=1). Nevertheless, it is also possible to select n greater than 1 (less frequent alternation), in order to limit the aerodynamic force generated, for example.

The present invention further relates to a flying craft with inertial navigation, in particular an airborne missile, which is capable of rotating and which comprises a pitch rate gyro.

According to the invention, said flying craft is noteworthy in that it comprises automatic control means for controlling said flying craft so that it can be rotated about its longitudinal axis by regularly alternating the direction of rotation, so as to cancel the scale factor effect of the pitch rate gyro, as well as to correct the common drifts, which are corrected by rotating said flying craft.

Moreover, said automatic control means advantageously belong to a conventional automatic control system of said flying craft, which system conventionally comprises more particularly means for rotating the flying craft.

The present invention thus allows both the correction of the common drifts (as is the case for the conventional method for auto-rotating the flying craft) and the additional cancellation of scale factor.

The figures in the appended drawings provide an understanding of how the invention can be implemented. In these figures, identical reference numerals designate similar elements.

Figure 1:
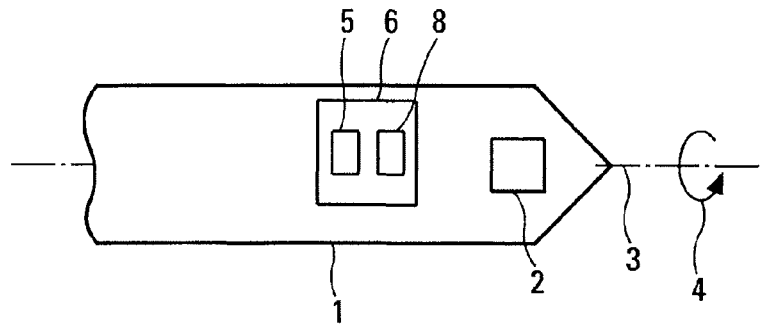
FIG. 1 shows a missile, in part and in a highly schematic manner, equipped with a pitch rate gyro, to which the present invention is applied.

The present invention is applied to a flying craft 1, in particular an airborne missile, shown in FIG. 1, for example, which is of the inertial navigation type and is capable of rotating (about its longitudinal axis 3, as illustrated by an arrow 4) and which comprises a conventional pitch rate gyro 2. The present invention is designed to manage the operation of said pitch rate gyro 2. This pitch rate gyro 2 is well known and its features are not further described in the following description.

This flying craft 1 comprises conventional control means 5 that belong to a conventional control system 6 (shown highly schematically in FIG. 1) and which comprise all of the elements required to guide and direct the flying craft 1, in particular so that it can reach and destroy a target. These control means 5 particularly comprise information processing means that automatically generate directing orders allowing the flying craft 1 to follow a trajectory for intercepting the target, and directing means (not shown) such as fins or any other type of known elements, which automatically apply these directing orders to the flying craft 1. All of these conventional means are well known and will not be further described hereafter.

According to the invention, said flying craft 1 further comprises automatic control means 8 for controlling the roll of said flying craft 1 so that it can be rotated about its longitudinal axis by regularly alternating the direction of rotation so as to cancel the scale factor effect of the pitch rate gyro. An example of roll control p (in rad/s) applied according to the invention is shown by way of example in FIG. 2.

Therefore, the object of the present invention is no longer to provide the flying craft 1 with a constant sign about its longitudinal axis, but to regularly alternate the direction of rotation (every n rotations, with n being an integer greater than or equal to 1). The roll control that is applied is thus a periodic signal with mean zero, as opposed to the aforementioned conventional method that uses a constant sign control.

Thus, by this control of the flying craft 1 that is designed to alternately rotate said craft, the scale factor effect of the pitch rate gyro 2 mounted on said flying craft 1 is naturally cancelled, as described hereafter, in addition to other drifts. These other common drifts are cancelled by the present invention in the same way as for the aforementioned conventional method for auto-rotating in one direction.

Figure 3:
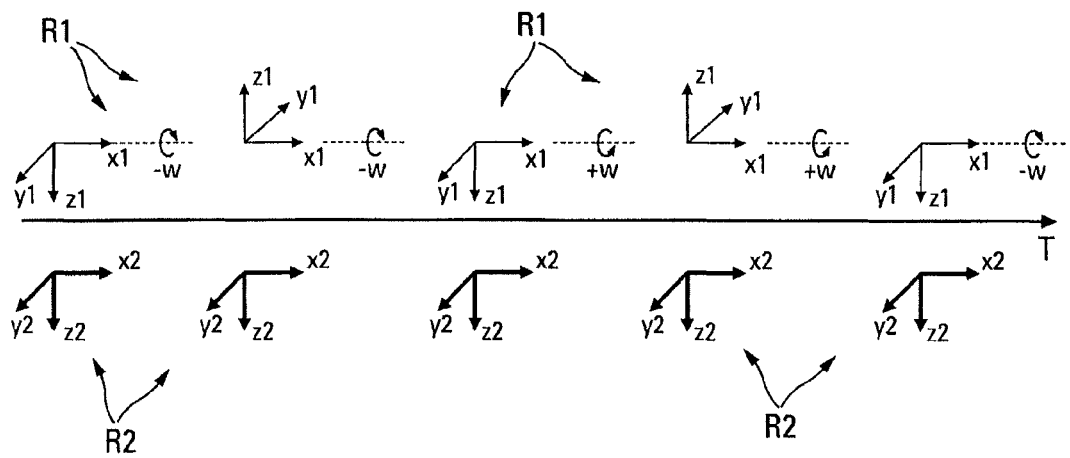
FIG. 3 is a schematic representation used to explain the effects generated by the alternated control of the direction of rotation of a flying craft on the measurements of a pitch rate gyro.

FIG. 3 helps explain the correction of the scale factor. FIG. 3 shows:
  an axis T illustrating the variation of the time during a flight of the flying craft 1;
  above this axis T, an axis system R1 comprising the conventional axes x1, y1 and z1 associated with the flying craft 1, which undergoes a rotation (about x1) generated by the control according to the invention, and this is carried out periodically (on each rotation) and alternately in one direction (−w) and then in the other direction (+w);
  below this axis T, an axis system R2 comprising ground axes x2, y2 and z2 that are fixed and in which the measurements undertaken are transposed.

FIG. 3 shows that, owing to the invention, the biasing errors (gyrometric or accelerometric) that are constant in craft axes, are automatically cancelled over a period (one rotation) once expressed as ground axes (navigation reference R2).

The inversion of the direction of rotation (±w) makes it possible to cancel the scale factor effect of the gyro 2 which otherwise would become unacceptable. By way of example, in the case of an error of 0.1%, and even for low w (for example, 1 Hz, that is 2π rad/s), the error generated in only 60 seconds would be 360°×60×0.001=21.6°, with unacceptable consequences with regard to speed and position drifts. The solution according to the invention, which consists in inverting the sign of w, allows the time average of this error to be cancelled.

The requirement for a gyroscope is thus greatly reduced (disappearance of the drift due to the scale factor of the pitch rate gyro) and the present invention enables a gyro to be retained for various applications. It thus allows the cost to be reduced for navigation performance that is comparable with the use of a gyroscope.

It should be noted that:
  the projection of the craft axes rotating towards ground axes remains constant for the longitudinal axis X (which differs from axes Y and Z): axis x1 remains constant and always equal to +x2 (which differs from y1 and z1, which rotate correctly). For this reason, the conventional auto-rotation does not correct the longitudinal faults: bias and scale factor of the gyro X (and of the accelerometer X);

for a rotational speed w about X, the angular drift per second about the axis X1=X2 is expressed as Δ+=bgx+fgx.w, with bgx being the gyro bias X, and fgx being the gyro scale factor X;
  in this state, if nothing is done, this term is thus constant in axes X1 and X2 and does not cancel on average;
  the term bgx is present and nothing can be done. However, setting down w=−w makes it possible to continue to ensure the rotation of the craft 1 (thus the cancellation of the other drifts corrected by the conventional auto-rotation) and in this case to implement an angular drift per second of Δ−=bgx−fgx.w.

The term bgx remains. However, the fgx terms are cancelled on average on a roundtrip (being supported by X1=X2, this is true for rotating reference and for fixed ground reference).

The present invention, which relates to the guiding and the inertial navigation of a flying craft 1, and more particularly to the management (limitation) of inertial drifts during flight, can be applied to any type of missile with inertial navigation, the rolling of which is possible without any other constraint (range, operating concept, etc.).

Figure 2:
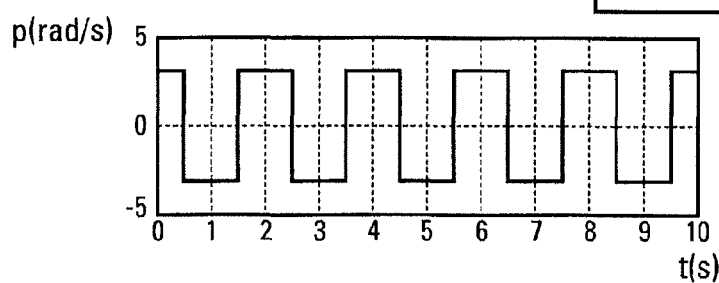
FIG. 2 is a graph showing an example of alternated control of the direction of rotation of a flying craft.

The example in FIG. 2, which illustrates the roll control p (expressed in rad/s) as a function of time t (expressed in seconds) schedules an inversion of the direction of the control after each rotation made by the flying craft 1 about its longitudinal axis 3 (n=1). However, it is also possible to select n greater than 1 (less frequent alternation), for example in order to limit the aerodynamic force generated. However, the rotational speed can be low and, with the drift due to the scale factor generated during one rotation in a first direction only being corrected (compensated) during the rotation in the other direction, changing the direction of rotation upon each rotation is generally preferred.

Inertial drift measurements, following the application of the control according to the present invention (particularly on a short-range, low-cost air-to-ground type missile, for which the additional cost of a gyroscope is very restrictive), and their comparisons with common drifts (without an attempt at correction) and with a constant sign auto-rotation solution (without gyroscope and with gyroscope), have been used to demonstrate that the present invention has inertial performance close to the solution with a gyroscope (40% to 60% of compensated drifts, as opposed to 50% to 75% for the solution with a gyroscope, with the exception of the roll angle), but without any additional cost or equipment constraints (no gyroscope or additional sensor).

Consequently, according to the invention:
  on the lateral axes:
    the biasing errors (gyrometric or accelerometric) of the sensors supported by the axes y1 and z1 are effectively corrected (in the same way as with a conventional auto-rotation);
    the scale factor errors (gyrometric or accelerometric) of the sensors supported by the axes y1 and z1 are also corrected (in the same way as with a conventional auto-rotation);
  on the longitudinal axis:
    the biasing errors (gyrometric or accelerometric) of the sensors supported by the axis x1 are not corrected (in the same way as with a conventional auto-rotation);
    the accelerometric scale factor error of the sensor supported by the axis x1 is not corrected (in the same way as with a conventional auto-rotation); but
    the gyrometric scale factor error of the sensor supported by the axis x1 is corrected (which differs from the conventional auto-rotation).

The present invention relates to all of the navigation, namely a complete inertial sensor block (except the longitudinal accelerometer).

The invention claimed is:

1. Method for automatically managing a pitch rate gyro (2) mounted on a flying craft (1) comprising at least an airborne missile with inertial navigation, which is capable of rotating, wherein, when using said pitch rate gyro (2), said flying craft (1) is automatically controlled so that said flying craft can be rotated about a longitudinal axis (3) defined therein by regularly alternating the direction of rotation, so as to cancel the scale factor effect of said pitch rate gyro (2), as well as to correct inertial drifts, which are corrected by rotating the flying craft (1).

2. Method according to claim 1, wherein the direction of rotation is alternated after each rotation of said flying craft (1) about itself.

3. Method according to claim 1, wherein the direction of rotation is alternated after each complete rotation (3) about the longitudinal axis.

4. Method according to claim 1, wherein said flying craft (1) is automatically controlled via a roll control that is applied to said flying craft, wherein the roll control is a periodic signal with a mean zero.

5. Flying craft (1) comprises at least an airborne missile with inertial navigation, which is capable of rotating and which comprises a pitch rate gyro (2), wherein said flying craft comprises automatic control means (8) for controlling said flying craft (1) so that said flying craft can be rotated about a longitudinal axis (3) defined therein by regularly alternating the direction of rotation, so as to cancel the scale factor effect of said pitch rate gyro (2), as well as to correct inertial drifts, which are corrected by rotating the flying craft (1).

6. Flying craft according to claim 5, wherein said automatic control means (8) belong to an automatic control system (6) of said flying craft (1).

* * * * *